United States Patent Office 3,420,191
Patented Jan. 7, 1969

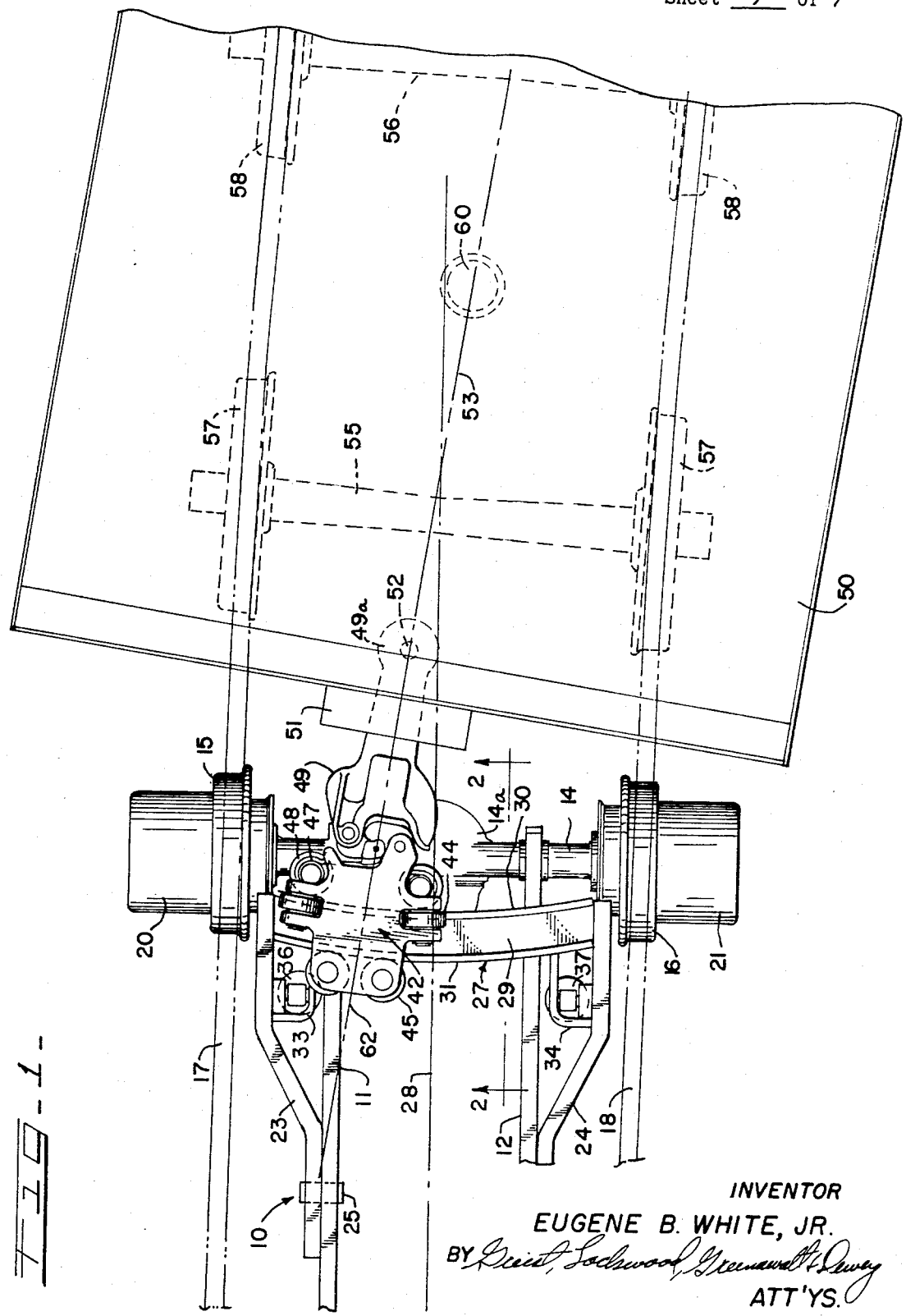

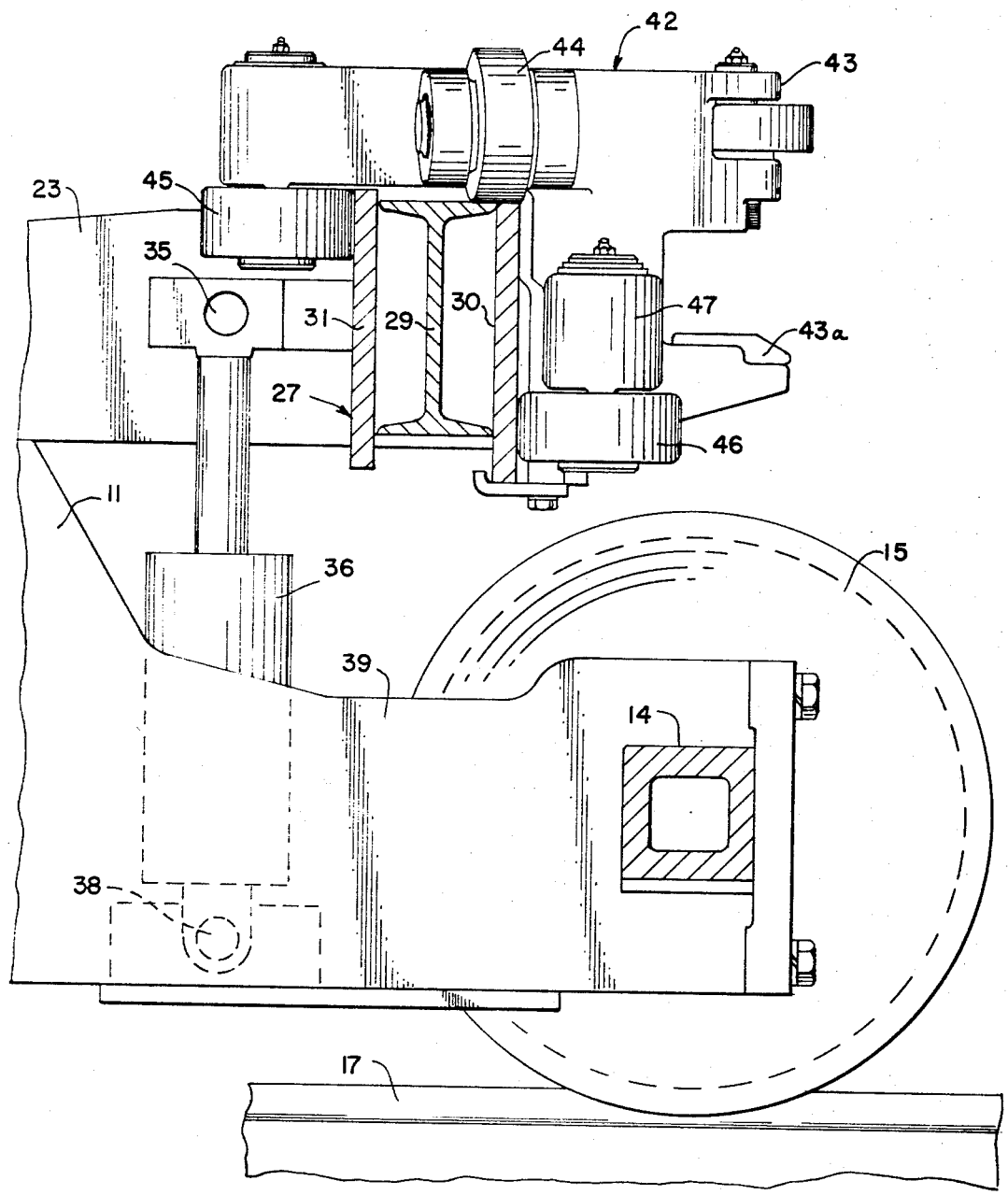

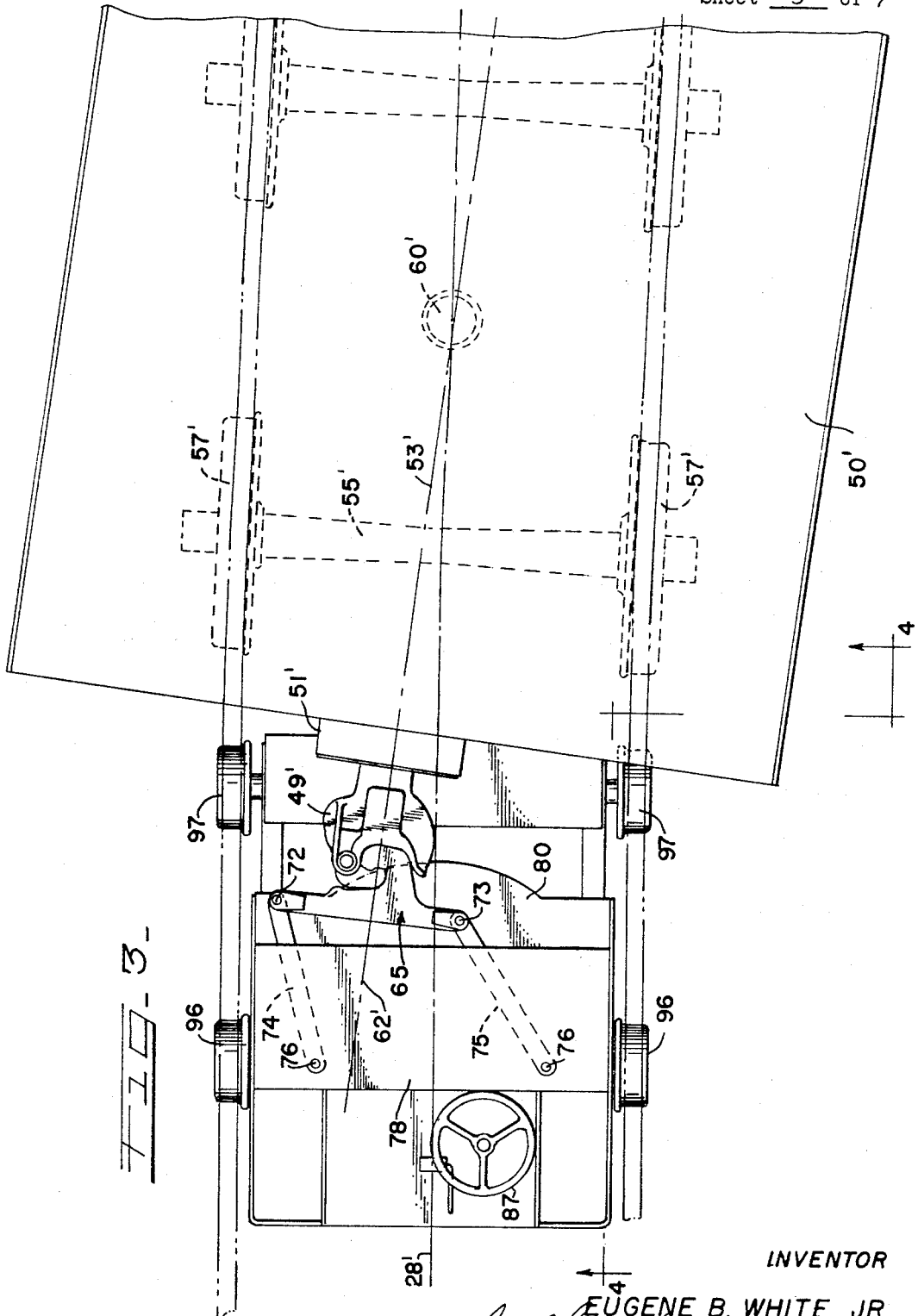

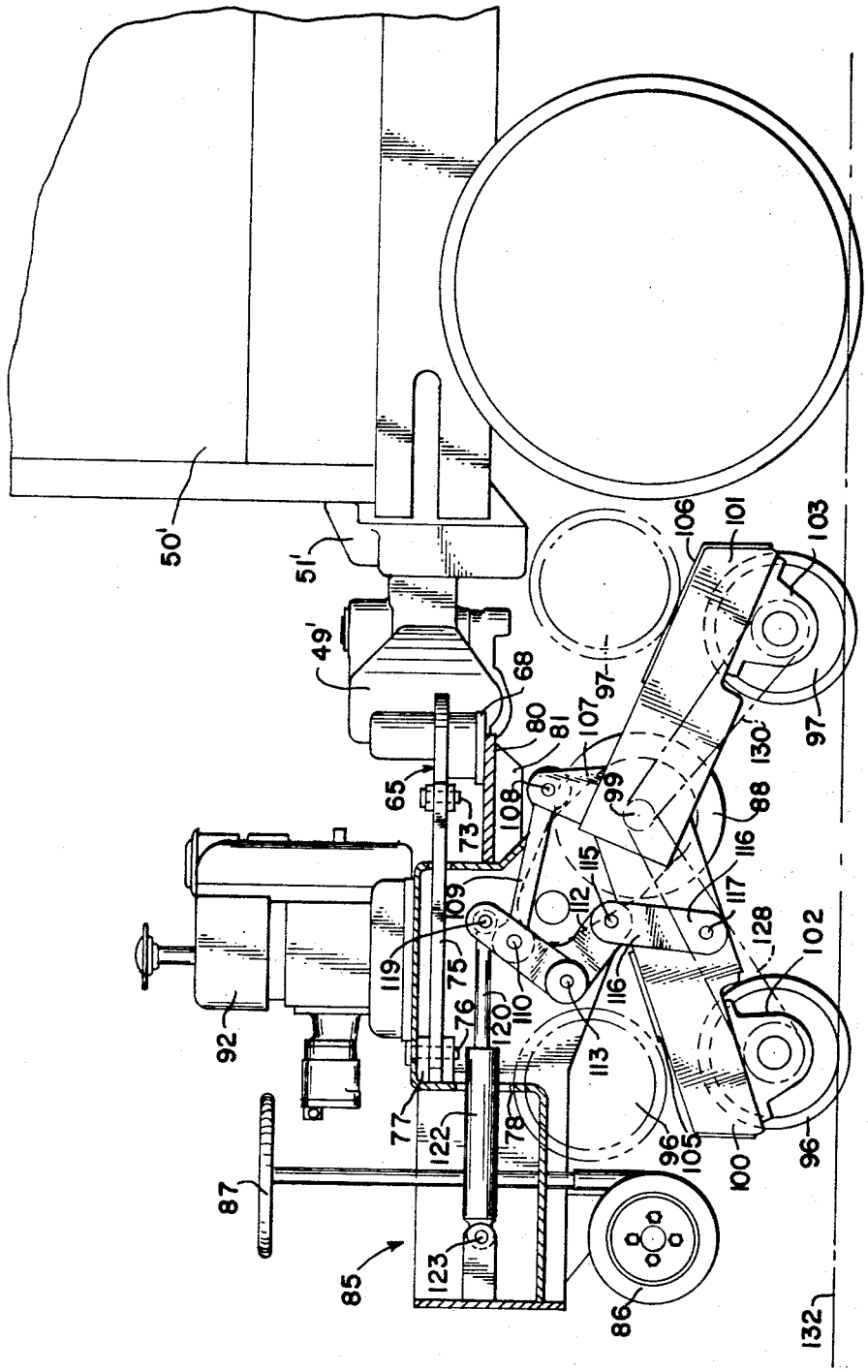

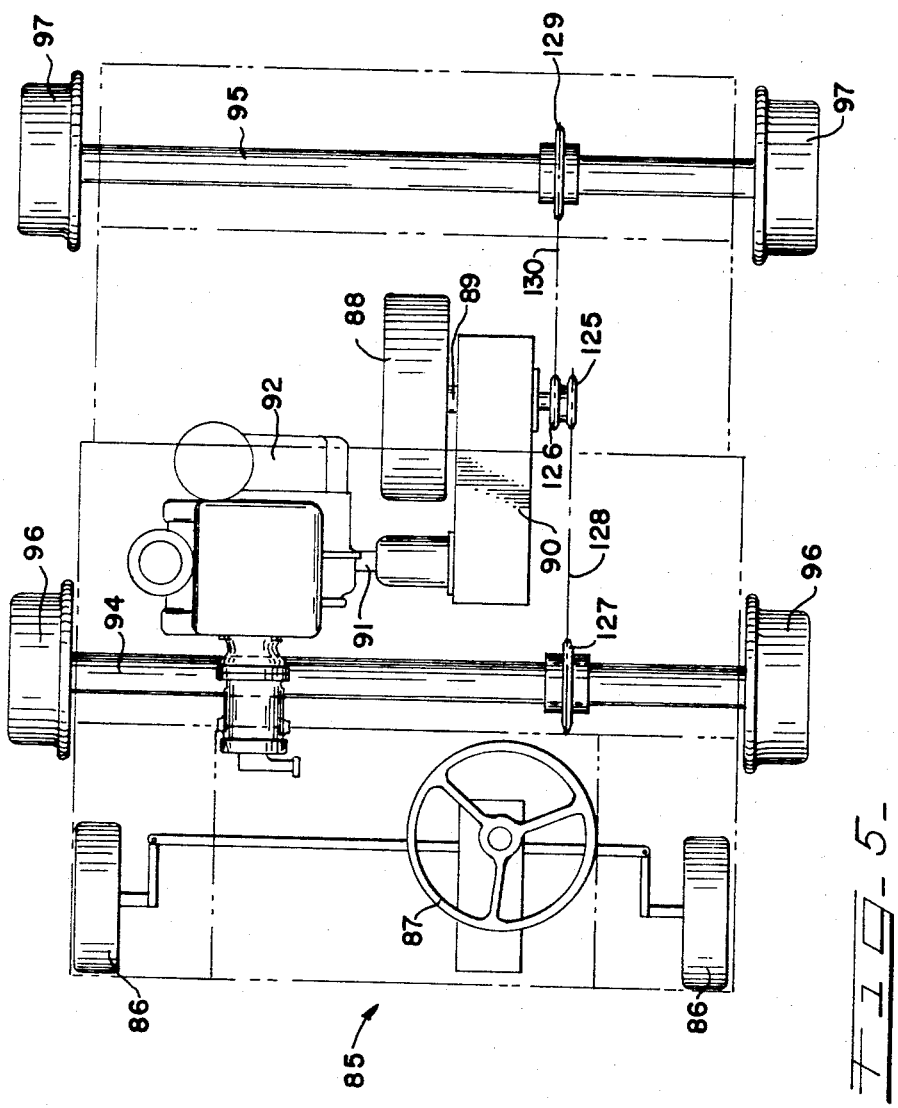

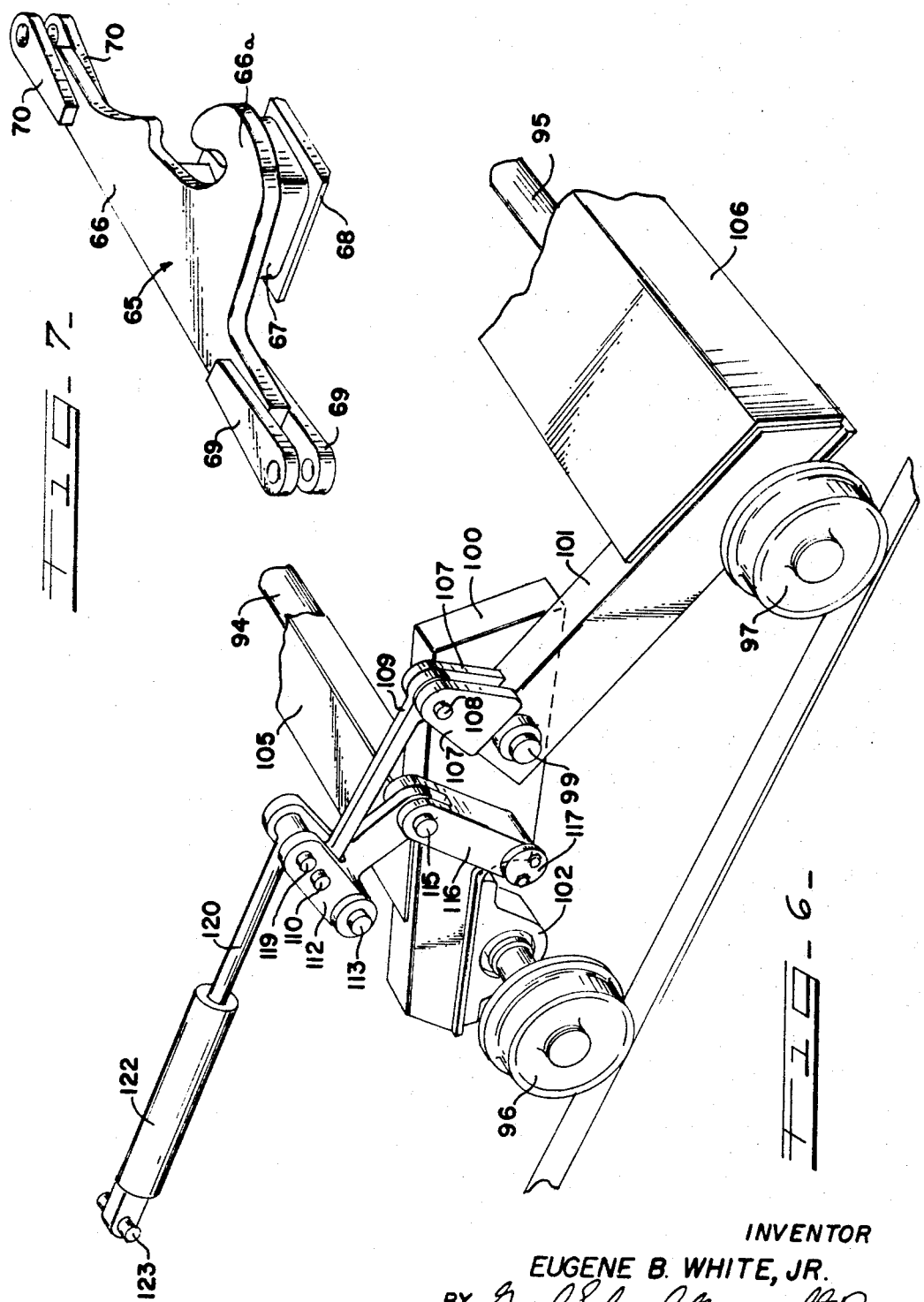

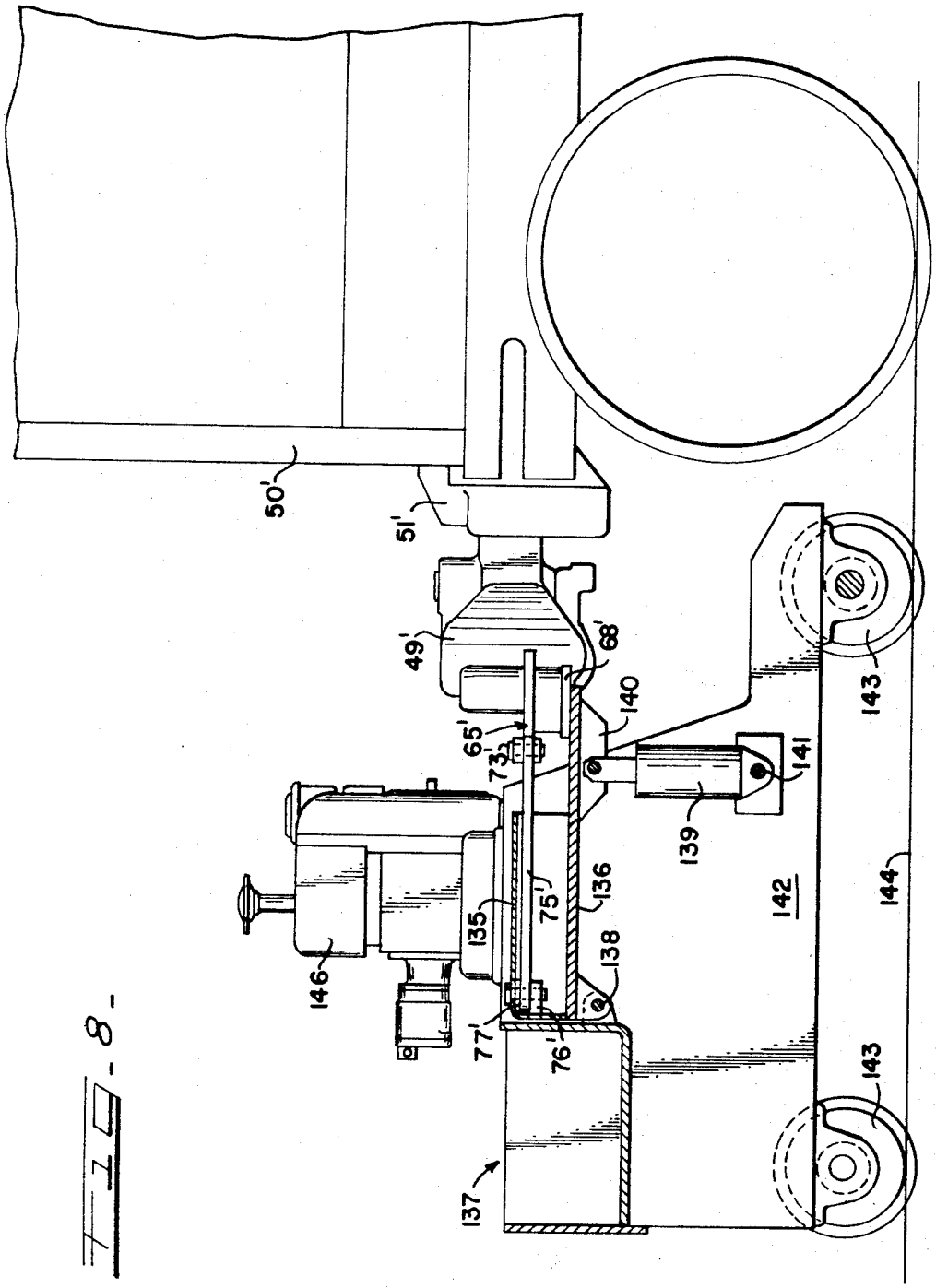

3,420,191
RAILWAY CAR MOVING VEHICLE
Eugene B. White, Jr., Park Forest, Ill., assignor to Whiting Corporation, a corporation of Illinois
Filed Nov. 7, 1966, Ser. No. 592,472
U.S. Cl. 105—73          15 Claims
Int. Cl. B61c 17/00; B61g 7/12

ABSTRACT OF THE DISCLOSURE

The coupler head of the traction vehicle is mounted for bodily movement in a horizontal arcuate path such that the coupler head is rocked in a horizontal plane for maintaining the longitudinal centerline of the latter in substantial coaxial relation with the longitudinal centerline of the coupler of a railway car positioned on a curved section of track and in coupled engagement with the traction vehicle. The traction vehicle includes road wheels and rail wheels. The rail wheels are mounted on two axles which are carried by support arms such that the rail axles may be swung about a common axis coaxial with one of the road wheel axles. Powered means are engaged with the support arms for raising and lowering the vehicle for alternate support thereof by the road wheels and the rail wheels and also for transferring to the traction vehicle a portion of the weight of a railway car coupled thereto.

---

The present invention has to do with improvements in small and light-weight vehicles of the type adapted for moving one or more railway cars along a section of track, which vehicles are sometimes referred to as traction vehicles.

Vehicles of the general type described above are well known in the art. A traction vehicle of this type includes a coupler head at one or both of its ends, which coupler is adapted for coupling engagement with the coupler of a railway car. The vehicle coupler head is also adapted for lifting engagement with a railway car coupler and the traction vehicle is provided with powered means, usually hydraulic rams, for lifting the vehicle coupler head relative to the vehicle, thereby to transfer to the latter a portion of the weight of a railway car coupled thereto for allowing the vehicle to develop a sufficient tractive force for transferring forces in draft and in buff to a number of railway cars.

A traction vehicle of the type described is usually provided with a set of road wheels which can be lowered and raised into and away from ground-engaging positions, thereby adapting the traction vehicle for both on-track and off-track travel. Such traction vehicles include powered means for driving both the rail wheels and the road wheels.

When a railway car traverses a curve, the pivot pin of the car coupler does not remain over the centerline of the track due to the fact that such pivot pin is horizontally off-set from the pivot axis of the adjacent railway car truck, about which axis such end of the railway car turns or pivots. Therefore, the couplers on these traction vehicles must be adapted to accommodate the horizontal shifting movement of the car coupler which results from this relative movement between the railway car coupler pivot and the track centerline.

In one form of traction vehicle coupling mechanism, as shown in Bock et al. Patent 2,718,195, assigned to the assignee of this application, the vehicle coupler head is pivoted to the traction vehicle much in the same manner as a railway car coupler. In another form of coupling apparatus, as shown in the patent to White, 3,198,137, also assigned to the assignee hereof the vehicle coupler head is mounted for movement in opposite directions along a horizontally extending, straight beam supported on the end of the traction vehicle and extending transversely thereof. In both of these forms of coupling mechanism, the vehicle coupler head moves a desired amount in a horizontal plane to accommodate the aforementioned relative movement of the railway car coupler pivot axis, thereby to permit coupling with a railway car when the latter is positioned on a curve and also to permit negotiating of a curve.

These forms of vehicle coupler head mounting have proven to be satisfactory in many applications. However, it has been found that such vehicle head mounting construction does not permit the requisite amount of lateral shifting movement to permit coupling of a traction vehicle with a railway car when the latter is positioned on a rather sharp curve, such as might be found in a yard or siding. Further, such coupler head mounting has not in many instances permitted coupling of a traction vehicle to newer forms of railway cars when the latter are positioned on a curved section of track. Such newer cars have greater length and longer couplers, each of these factors increasing the horizontal relative movement between the coupler pivot pin and the track centerline, which movement occurs when such cars negotiate a curve. In the instances just mentioned, it may not be possible to shift the vehicle coupler head laterally and position the same for coupling with a coupler of a railway car located on a curved section of track, or if the traction vehicle and a railway car are already coupled, derailing of the traction vehicle might result when negotiating sharp curves. The present invention has to do with unique means for mounting the vehicle coupler head to the traction vehicle, thereby to eliminate the aforementioned problems.

As mentioned above, traction vehicles of the type under consideration are usually provided with vertically shiftable road wheels, adapting the traction vehicle for both on-track and off-track movement. According to the present invention, the rail wheels only are mounted for vertial shifting movement thereby to raise and lower the vehicle for being alternately supported by the road wheels and the rail wheels. Such shifting of the rail wheels also permits lifting of the vehicle, and the coupler head carried thereby, when the vehicle is coupled with a railway car, thereby to transfer weight to the former from the latter, and thereby obviating separate powered means for lifting the vehicle coupler head relative to the traction vehicle.

A primary object of the present invention is the provision of a traction vehicle having new and improved means for mounting the coupler head thereof for horizontal shifting movement and for lifting the coupler head for transferring weight to the vehicle from a railway car coupled thereto.

Another object of the present invention is the provision of new and improved mechanism mounting a coupler head to a traction vehicle, which mechanism will permit coupling of the vehicle to a railway car when the latter is positioned on a relatively sharp curve.

Still another object of the present invention is the provision of new and improved mechanism for mounting a coupler head to a traction vehicle, which mechanism permits the centerline of the coupler head to be in substantial coaxial relation with the centerline of the railway car coupler when the vehicle and railway car are located on a section of track having a relatively sharp curve.

Another object of the present invention is the provision of new and improved mechanism for mounting a coupler head to a traction vehicle, which mechanism provides for movement of the coupler head in a horizontal arcuate path and during the course of such movement causes bodily rocking of the coupler head in a horizontal plane.

Another object of the present invention is the provision of new and improved means for raising and lowering a traction vehicle for alternately supporting the same by road wheels and rail wheels, such means also serving to provide the lifting force for transferring to the traction vehicle a portion of the weight of a railway car coupled thereto.

Even another object of the present invention is the provision of new and improved means for swingably mounting pairs of rail wheels to the traction vehicle for swinging movement of the former about a common axis coaxial with the axis of rotation of one of the road wheels of the traction vehicle.

Still another object of the present invention is to provide a traction vehicle according to the foregoing object and also provide the same with drive train means cooperating with the means for mounting the rail wheels thereby to permit driving of the latter as well as the road wheels.

Another object of the present invention is the provision of a traction vehicle according to the foregoing object and also provided with unique linkage means for raising and lowering the rail wheels.

These and other objects and advantages of the invention will become apparent from the following specification disclosing preferred embodiments of the invention disclosed in the accompanying drawings wherein:

FIGURE 1 is a top-plan view of one form of the coupler head mounting mechanism of the present invention showing the same mounted on one end of a traction vehicle (with many parts thereof removed for better illustration of the invention) coupled to a railway car on a curved section of track;

FIGURE 2 is an enlarged section taken along the line 2—2 of FIGURE 1, but showing only the vehicle coupler head and the means mounting the same;

FIGURE 3 is a top-plan view similar to FIGURE 1 but showing another form of coupler head mounting mechanism supported on a different traction vehicle which is constructed in accordance with the principles of the present invention;

FIGURE 4 is a section taken along the line 4—4 of FIG. 3;

FIG. 5 is a top-plan view of the traction vehicle of FIG. 3, primarily showing the drive train arrangement for the road wheels and rail wheels;

FIG. 6 is a fragmentary isometric view primarily showing the linkage arrangement for raising and lowering the rail wheels of the traction vehicle shown in FIGS. 3–5;

FIG. 7 is an enlarged isometric view of the coupler head associated with the coupler head mounting means of FIGS. 3 and 4; and FIG. 8 is a partial vertical section and partial side elevation of the coupler head mounting means of FIGS. 3 and 4 mounted on a still different form of traction vehicle.

Referring now to FIGS. 1 and 2, a traction vehicle with which the coupler head mounting mechanism of the present invention may be associated, such traction vehicle being fragmentarily and partially illustrated and generally designated 10, includes a pair of parallel, longitudinally extending frame members 11 and 12 supported at their rear ends by a rear axle 14 having a differential housing portion 14a. The axle 14 mounts a pair of rail wheels 15 and 16 supported on a section of track defined by rails 17 and 18. The rail wheels 15 and 16 mount respective road wheel driving hubs 20 and 21. It will be understood that the differential housing portion 14a is connected with a drive shaft (not shown) forming part of the driving system of the traction vehicle thereby to drive the rail wheels 15 and 16. It will also be understood that the traction vehicle includes four rail wheels including the rail wheels 15 and 16 whereby the traction vehicle may be driven along a track section for pulling one or more railway cars.

The traction vehicle 10 may be of the type shown in White Patent No. 3,198,137 wherein the hubs 20 and 21 drive rear road wheels when the latter (and front road wheels) are in their road engaging positions in which case the rail wheels including the wheels 15 and 16 are elevated from the railway track. Such road wheels are used when it is desired to drive the traction vehicle 10 from one track section or rail site to another. For a more detailed explanation of the traction vehicle and the operation thereof, reference should be made to the aforementioned White patent.

Frame members 11 and 12, which are virtually identical but of opposite hand construction, have stepped-up portions, as indicated in FIGURE 2, and pivotally mount a pair of arms 23 and 24, respectively, for swinging movement about a pair of coaxial, horizontally disposed pins, one of such pins being illustrated and designated by the numeral 25. The other ends of these arms are connected to respective opposite ends of a horizontally extending, elongated guideway or beam 27 which extends generally transversely of the vehicle in symmetrical relation with the longitudinal centerline thereof, such centerline being designated by the numeral 28. As noted in FIGURE 2, beam 27 will be seen to consist of an I-beam 29 having a pair of vertically disposed plates 30, 31 secured thereto as by welding.

As seen in FIGURE 1, a pair of right-angle bracket plates 33, 34 are connected to plate 31 and respective arms 23, 24. Such bracket plates mount a pair of pins (one pin being shown in FIGURE 2 and designated 35), which pins pivotally engage the outer ends of piston rods forming part of a pair of hydraulic ram assemblies 36 and 37. The bases of the cylinders forming part of these rams are suitably pivotally mounted on the framework of the traction vehicle. As noted in FIGURE 2, the cylinder forming part of hydraulic ram assembly 36 is pivotally mounted about a pin 38 supported by framework 39 secured to the frame member 11 of the vehicle. It will be understood that the rams 36, 37 may be operated from the operator's cab on the traction vehicle for raising and lowering the guideway or beam 27, such beam moving in a generally vertical direction about the pivot axis formed by the pins 25.

A vehicle coupler head, generally designated 42, is mounted on the beam 27 for rolling movement in either direction thereon. Coupler head 42 includes a portion 43 adapted for mating or coupling engagement with a standard railway car coupler, such portion 43 being provided with a pad or seat 43a arranged for lifting engagement with the underside of a standard railway car coupler. The coupler head 42 includes a first pair of rollers 44 arranged for rolling engagement with the upper edge of plate 30 and a portion of the top flange of the beam 29, a second pair of rollers 45 arranged for rolling engagement along the upper and outer portion of the plate 31, and a third pair of rollers 46 adapted for rolling engagement along the lower outer portion of the plate 30, the last mentioned rollers being mounted by bearing portions 47 formed integrally with the coupler 42.

FIGURE 1 shows the coupler head 42 in coupling engagement with a standard railway car coupler 49 forming part of a railway car 50, which coupler includes a shank portion 49a extending into a housing 51 fixed on the adjacent end of the railway car. The shank portion 49a is pivotally mounted in the usual manner about a vertically disposed pin 52 which is disposed on the longitudinal centerline of the car represented by the numeral 53. The railway car 50 includes the usual truck assembly having a pair of rail axles 55, 56 mounting respective pairs of rail wheels 57 and 58 supported on the rails 17 and 18. The truck assembly including the rail wheels 57, 58 is mounted to the rail car for pivoting movement about a pivot pin 60, which pin of course lies on the longitudinal centerline of the railway car.

As clearly seen in FIGURE 1, the guideway or beam 27 is curved in a horizontal plane and concavely with respect to the adjacent end of the railway car 50. In the embodiment of the invention shown for purposes of illustration, the curvature of the beam 27 is described by a circle having its center adjacent the truck pivot axis 60 (when the longitudinal central axis 28 of the vehicle and the longitudinal central axis 53 of the car 50 are co-linear, i.e., when the vehicle and the car are coupled together on a straight section of track). The reason for this curvature in the beam or guideway 27 will become apparent from close examination of FIGURE 1 showing the traction vehicle traversing a curved section of track with the car 50 coupled thereto.

When the vehicle 10 and car 50 traverse a curve, the pivot point 52 of the railway car coupler 49 is not located over the track centerline due to the fact that the pivot pin 52 is offset from the pivot axis 60 of the truck, about which pivot pin the adjacent end of the car 50 rotates or pivots. The coupler head 42 automatically rolls along the curved beam 27 to accommodate this relative movement of the railway car coupler 49. In doing so, it will be noted that the longitudinal centerline 62 of the coupler 42 remains in substantial co-axial relation with the longitudinal centerline of the car coupler 49 which happens to be co-linear with the car centerline 53 in the arrangement of the various parts as shown in FIGURE 1. In other words, due to the curved nature of the beam 27 which provides a curved or arcuate path of movement for the coupler head 42, the latter remains in co-axial relation or alignment with the railway car coupler during negotiation of curved sections of track by the coupled vehicle and car. The coupler head 42 moves in an arcuate path along the beam 27 and is rocked bodily in a horizontal plane during the course of such movement; this permits coupling of the head 42 with the coupler of a railway car when the latter is positioned on a section of track having a relatively sharp curve. Powered means, such as a hydraulic ram, may be provided for moving the coupler head 42 along the beam 27 thereby to facilitate coupling. Because the substantial co-axial relation between the respective centerlines of the coupler head and car coupler is maintained during traversing of a curve, the forces in draft or buff transmitted to the coupler head 49 are transferred to the railway car coupler in an efficient manner.

The present invention is not to be limited to construction wherein the center of curvature of the beam 27 is located adjacent the pivot axis 60 of the railway car truck. Although it is desirable to have the center of curvature of the beam so located, this is not possible to do in all instances since the distance between the truck pivot axis and the adjacent railway car coupler differs widely depending on the type of railway car. In practice, it is desirable to provide the beam 27 with a curvature such that the longitudinal centerline 62 of the coupler head 42 will remain in substantial co-axial relation with the centerlines of most of the railway car couplers engaged by the coupler 42 during the full limits of travel of the latter along the beam 27.

Also, the present invention is not to be limited to construction wherein the curvature of the beam 27 is defined by the arc of a circle. It is within the scope of the invention to provide the beam or guideway in the shape of a compound curve symmetrical with respect to the vehicle longitudinal centerline.

A portion of the weight of the railway car 50 is transferred to the traction vehicle 10 for increasing its tractive effort by actuating the hydraulic rams 36, 37 thereby to lift the beam 27 and the coupler 42. This lifting action brings the seat 43a into lifting engagement with the railway car coupler 49 thereby to transfer a portion of the weight of the car 50 to the vehicle 10. For a more detailed explanation of weight transfer in traction vehicles, reference should be had to the aforementioned White patent.

It is desirable to have the vehicle coupler 42 as near as possible to the adjacent end of the vehicle 10 so as to minimize the possibility of interference between the latter and the railway car. However, the point of weight transfer between the vehicle coupler and the railway car coupler should be between the axles of the traction vehicles to avoid any tendency of the latter to tip during weight transfer. In FIGURE 1, it will be noted that the beam 27 is inwardly offset from the rear axle 14 such that the area of weight transfer between the coupler 42 and the railway car coupler 49 is disposed generally over the rear axle, such area being generally defined by the seat 43a.

It will be observed, from an examination of FIGURE 1, that as the coupler head rolls toward either end of the beam 27, the railway car coupler is forced away from the traction vehicle longitudinally of the latter. This movement minimizes the possibility of interference between the rail wheels 15 or 16 and the adjacent end of the car.

Another form of mechanism for mounting a coupler head to a traction vehicle is illustrated in FIGS. 3, 4 and 7. This other or modified form of coupler head mounting is shown on a traction vehicle constructed in accordance with the principles of the present invention, which traction vehicle will be described hereinbelow. The various parts or elements shown in FIGS. 3 and 4 which correspond to the parts or elements described in FIGS. 1 and 2 are indicated by the prime form of numeral.

The modified form of coupling mechanism includes a coupler head 65 best illustrated in FIG. 7. This coupler head consists of a plate 66 having a portion 66a defining a hook-like opening for coupling engagement with a standard railway car coupler. Secured to the underside of the plate 66 is a block 67 having an opening corresponding to the hook-like opening formed by the plate portion 66a. The opening formed by the block 67 is also adapted for coupling engagement with a railway car coupler and serves to increase the area of contact between such coupler and the coupler head 65. A rectangular plate 68 is secured to the underside of the block 67. The plate 66 includes oppositely extending end portions mounting respective pairs of ear plates 69 and 70.

Ear plates 69 and 70 are bored and receive pins 72, 73 (FIG. 3), which pins are pivotally engaged with ends of a pair of links 74 and 75, respectively. The other ends of the links 74, 75 are pivotally secured to the traction vehicle for pivoting movement about spaced vertical axes. As noted in FIG. 2, the link 75 is pivotally engaged with a pin 76, opposite ends of which pin are mounted in bores formed in a pair of ear plates 77. These ear plates are suitably secured to a plate 78 forming part of the chassis of the traction vehicle. It will be understood that link 74 is pivotally mounted to the traction vehicle in the same manner as the link 75.

The plate 68 forming part of the coupler head 65 is slidably supported on a horizontally disposed plate 80 which is fixedly supported from the chassis plate 78 of the traction vehicle and braced by one or more plates 81. The plate 68 slides on the upper surface of the plate 80 during movement of the coupler head 65 relative to the traction vehicle. The plate 68 also serves as the seat or pad which is brought into lifting engagement with the underside of the railway car coupler for transferring to the vehicle a portion of the weight of the car.

It will be understood that when the longitudinal centerline 62' of the coupler head 65 is co-axial with the longitudinal centerline 28' of traction vehicle, the pivot pins, 72, 73 and the two pins 76 define a horizontally disposed trapezoid, the base portion of which extends between the pins 76 in perpendicular relation with the centerline 28'. By reason of this arrangement, the links 74, 75 cause the coupler head 65 to swing in a horizontal arcuate path (which path is convex with respect to the adjacent end of the car 50′) and during the course of such movement also cause the coupler head 65 to be bodily rocked such that the longitudinal centerline 62′ thereof is arranged in substantial co-axial relation with the longitudinal centerline of the car coupler 49′ (such last-mentioned centerline being co-axial with the railway car centerline 53′ in the configuration of parts shown in FIG. 3). In other words, the arrangement of the links 74, 75 causes the coupler head 65 to be shifted such that the longitudinal centerline thereof can be brought into co-axial alignment with the centerline of the railway car coupler which is located on a curved section of track, thereby permitting the traction vehicle to be coupled to a railway car positioned on such curved track. Of course, the links 74, 75 permit negotiating of rather sharp curves by the traction vehicle and a railway car coupled thereto.

The traction vehicle illustrated in FIGS. 3–5 will now be described. This traction vehicle, which is constructed in accordance with the principles of the present invention and which is generally designated 85, includes a pair of steerable road wheels 86 controlled through appropriate linkage by a steering wheel 87. It will be understood that the vehicle includes an operator's seat (not shown) suitably mounted adjacent the steering wheel.

As noted in FIG. 5, the traction vehicle 85 includes a single trailing road wheel 88 which is suitably supported centrally of the vehicle on an axle 89. This axle is driven from a gear box 90, such gear box being driven from a drive shaft 91 extending from a transmission (not shown). The transmission is driven from an internal combustion engine 92, which engine is appropriately mounted on the chassis of the traction vehicle.

The details of construction relating to powering the traction vehicle by driving the road wheel 88 thereof are not shown or described herein as of themselves they form no part of the present invention. It will be apparent to those skilled in the art that various commercially available equipment can be used to drive the road wheel 88.

The traction vehicle 85 includes a pair of rail axles 94 and 95 mounting respective pairs of rail wheels 96 and 97. As will be explained hereinbelow, the rail wheels are mounted to the traction vehicle for being raised and lowered thereby alternately to support the traction vehicle from the road wheels and the rail wheels and also to develop a lifting force at the coupler head 65 thereby to transfer weight to the traction vehicle. The means for mounting and swinging the rail wheels are symmetrical with respect to the longitudinal centerline of the traction vehicle, and therefore only such means which are adjacent one side of the traction vehicle are described and illustrated.

Referring to FIGS. 4–6, it will be understood that the chassis of the traction vehicle supports a pivot pin 99, the longitudinal central axis of such pin being co-axial with the longitudinal central axis or axis of rotation of the road wheel axle 88. The pin 99 pivotally mounts adjacent ends of a pair of arms 100 and 101. The other end of arm 100 mounts a journal assembly 102 which supports one end of the axle 94. Similarly, the other end of the arm 101 mounts a journal assembly 103 which supports one end of the axle 95. Arm 100 is preferably connected to the other arm 100 (which is not illustrated) by a crossplate 105. In like manner, arm 101 is connected with the other arm 101 (not shown) by a crossplate 106.

The end of arm 101 adjacent the pivot pin 99 has a pair of ear plates 107 fixedly connected thereto. These ear plates include bores mounting a pin 108, which pin is pivotally engaged with one end of a link 109. The other end of the link 109 is pivotally engaged with a pin 110, such pin being carried adjacent one end of a generally right-angle arm member 112. This arm member is pivotally mounted intermediate the ends thereof about a pin 113, which pin is suitably supported from the chassis of the traction vehicle 85. The other end of the arm member 112 mounts a pin 115; this pin pivotally engages one end of a link 116. The other end of this link is pivotally mounted to the arm 100 intermediate the ends thereof, as by a pivot pin 117. The end of the arm member 112 adjacent the pin 110 carries another pin 119, which pin pivotally receives one end of a piston rod 120. The piston rod 120 is connected to a piston head (not shown) forming part of a hydraulic ram 122. The cylinder of the hydraulic ram 122 is pivotally mounted to the chassis of the traction vehicle for swinging movement in a vertical plane about a pivot pin 123.

By referring to FIGS. 4 and 6, it should be apparent that operation of the hydraulic ram 122 will cause simultaneous swinging movement of the rail axles 94, 95 about a common axis defined by the longitudinal central axis of pivot pin 99. As pointed out above, such axis is co-axial with the longitudinal centerline of the axle 89 supporting the road wheel 88.

Referring now to FIG. 5, it will be seen that the axle 89 extends to the gear box 90 and mounts a pair of sprocket wheels 125, 126. Sprocket wheel 125 is coplanar with a sprocket wheel 127, this last-mentioned sprocket wheel being mounted on the rail axle 94. A chain, diagrammatically illustrated and designated by numeral 128, is trained around sprocket wheels 125 and 127. Sprocket wheel 126 is coplanar with sprocket wheel 129, this last-mentioned sprocket wheel being fixedly mounted on the rail axle 95. Another drive chain, diagrammatically illustrated and designated 130, is trained around sprocket wheels 126 and 129.

It should now be apparent that the rail wheels are driven from the road wheel axle 89, which axle is in turn driven from the internal combustion engine carried by the traction vehicle. Therefore, a single source of power carried by the traction vehicle drives both the road wheels and the rail wheels and serves as the motive force for both on-track and off-track movement of the traction vehicle. Swinging movement of the rail axles does not in any way affect the drive for the rail wheels since this swinging movement is about the road wheel axle 89 which mounts the sprockets 125, 126.

It will be understood that the traction vehicle 85 is adapted for off-track movement by raising the rail wheels thereby allowing the vehicle to be supported by the road wheels 86, 88. For off-track movement, the rail wheels are raised to the phantom line positions shown in FIG. 4. When it is desired to locate the traction vehicle on a section of railway track, the vehicle is driven to a position wherein the rail wheels 96, 97 are positioned over the rails of track. Hydraulic rams 122 are then operated for lowering the rail wheels into contact with the rails. Continued operation of the hydraulic rams 122 for lowering the rail wheels will cause lifting of the entire traction vehicle relative to the rails, one of such rails being represented by the phantom line 132 in FIG. 4.

The traction vehicle 85 is raised to a level permitting coupling between the coupler head 65 and the railway car coupler 49′. After such coupling, further operation of the hydraulic rams 122 brings the plate 68 of the coupler head into lifting engagement with the railway car coupler, thereby transferring a portion of the weight of the railway car 50′ to the traction vehicle 85. Therefore, it will be apparent that the hydraulic rams 122 and the various linkage operated thereby serve both to raise and lower the rail wheels adapting the traction vehicle for both on-track and off-track travel and also serve as the means for lifting the coupler head 65 to achieve weight transfer.

Should the modified coupler head mounting mechanism be carried by a traction vehicle which does not have the capability of raising and lowering itself by movement of the rail wheels to achieve weight transfer, means must be provided for moving the coupler head relative to the traction vehicle to achieve weight transfer. Such an arrangement is shown in FIG. 8. The coupler head mounting arrangement shown in this figure is essentially the same as that shown in FIGS. 3, 4 and 7, and the corresponding parts are indicated by the prime form of numeral in FIG. 8.

The ear plates 76, 77' are connected to the rear wall of a box-like structure which opens toward the railway car 50' and consists of an upper plate 135 and a lower plate 136. In other words, the links 74', 75' are pivotally mounted for horizontal swinging movement between the plates 135, 136. The plate 68', forming part of the coupler head 65', is slidably supported by the upper surface of the plate 136. The box-like structure including the plates 135, 136 is pivotally mounted to the traction vehicle, generally designated 137, for swinging movement about a horizontal axis transverse to the vehicle, such axis being defined by pins 138. A hydraulic ram 139 has the piston rod thereof pivotally connected to a web plate 140, such web plate being secured to the under side of plate 136. The cylinder of the hydraulic ram 139 is pivotally mounted on a pin 141, which pin is suitably mounted from a chassis or frame member 142. The traction vehicle 137, which may be of known construction and which of itself forms no part of present invention, includes rail wheels 143 which roll on railway track, the upper surface of one rail being shown in FIG. 8 and represented by the numeral 144. Traction vehicle 137 includes an internal combustion engine 146 associated with a suitable drive train (not shown) for driving the rail wheels 143.

It will be apparent that operation of the hydraulic ram 139 will cause lifting of the coupler head 65' for transferring a portion of the weight of the railway car 50' to the traction vehicle 137. It will be understood that the operation of the coupler head 65' is the same as the operation of the coupler head 65, the only difference being in the means for raising and lowering the coupler head.

I claim:

1. In a powered vehicle of the type adapted to roll on railway track for moving one or more railway cars therealong, which vehicle is of the type adapted for transferring to the vehicle a portion of the weight of the railway car, mechanism for coupling said vehicle to a railway car comprising, a coupler head, support means on said vehicle engaged with said coupler head thereby supporting the latter for bodily movement in a horizontal arcuate path symmetrical with respect to the longitudinal centerline of the vehicle, said support means serving, during the course of said bodily movement, to rock said coupler head in a horizontal plane such that the longitudinal centerline of the latter is shifted for substantial coaxial alignment with the longitudinal centerline of the coupler of a railway car positioned on a curved section of track in coupled engagement with said vehicle, said support means including a support member on which said coupler head rides during its movement along said path, such support member being disposed beneath at least a substantial portion of the coupler head and serving as the primary member supporting the same, said coupler head including means defining an opening adapting the same for coupling engagement with a railway car coupler, a seat rigid with said coupler head and disposed centrally thereof beneath said opening, said seat being adjacent said support member and being generally horizontally disposed for lifting engagement with the undersurface of a railway car coupler, and powered apparatus on the vehicle for lifting said support member thereby to transfer to the vehicle a portion of the weight of a railway car coupled thereto.

2. The mechanism according to claim 1 wherein said means includes a generally horizontally disposed guideway extending transversely of the vehicle centerline in symmetrical relation therewith, which guideway is curved in a generally horizontal plane concavely with respect to the adjacent end of the railway car coupled to the vehicle, said coupler head being mounted on said guideway for movement in either direction therealong.

3. The mechanism according to claim 1 wherein said means includes a pair of generally horizontally disposed links, each link being connected at one end thereof to the vehicle at a vertical fixed pivot and being connected at the other end thereof to the coupler head at a vertical pivot, all of said pivots defining a horizontally disposed trapezoid when the longitudinal centerline of the coupler head is coaxial with the longitudinal centerline of the vehicle, said trapezoid being symmetrical with respect to the vehicle centerline and having its base defined by a line extending between said fixed pivots and normal to the vehicle centerline.

4. In a powered vehicle of the type adapted to roll on railway track for moving one or more railway cars therealong, wherein such vehicle is of the type adapted to transfer thereto a portion of the weight of the railway car, mechanism for coupling said vehicle to a railway car comprising, a pair of generally horizontally disposed links, each link having one end thereof mounted to the vehicle at a fixed vertical pivot, a coupler head, said coupler head being of unitary construction and being connected to the other ends of said links at spaced vertical pivots, all of said pivots defining a horizontally disposed trapezoid when the longitudinal centerline of the coupler head is coaxial with the longitudinal centerline of the vehicle, such trapezoid being symmetrical with respect to the vehicle centerline and having its base defined by a line extending between said fixed pivots and normal to the vehicle centerline, said links mounting said coupler head for bodily movement in a horizontal arcuate path symmetrical with respect to the longitudinal centerline of the vehicle, said links serving, during the course of said bodily movement, to rock said coupler head in a horizontal plane such that the longitudinal centerline of the latter is shifted for substantial coaxial alignment with the longitudinal centerline of the coupler of a railway car on a curved section of track in coupled engagement with said vehicle, said coupler head including means defining an opening adapting the head for coupling engagement with a railway car coupler, a seat rigid with said coupler head centrally thereof, which seat is disposed beneath said opening and is adapted for lifting engagement with the railway car coupler, a support member on the vehicle and engaged with the underside of said coupler head beneath said seat for defining a horizontal surface on which the coupler head rides during said bodily movement, and powered means on the vehicle for lifting said support member.

5. The mechanism according to claim 4 further defined by the fixed vertical pivot connections of said links being carried by a member which is mounted on the vehicle for swinging movement about a horizontal axis transverse to the vehicle centerline, said support member being mounted for vertical movement relative to the vehicle and being engaged by powered means for lifting said coupler head thereby to transfer to the vehicle a portion of the weight of a railway car coupled thereto.

6. In a powered vehicle of the type having a coupler head for coupling and lifting engagement with a railway car coupler thereby to move one or more railway cars along a section of track, the improvement comprising, said vehicle including a set of road wheels, powered means carried by the vehicle and connected by a drive train to the axle of at least one of said road wheels for driving the latter, said vehicle also including a first rail axle mounting a pair of rail wheels and a second rail axle mounting another pair of rail wheels, which rail axles are arranged one on each side of said road wheel axle in parallel relation therewith, said rail axles being mounted to the vehicle by separate arm means each pivoted about a common axis co-axial with the central axis of said road wheel axle, means defining a continuation of said drive train and connected with at least one of said rail axles for driving the rail wheels mounted thereby, said drive train continuation means including said road wheel axle, and other powered means carried by the vehicle and engaged with said arm means for swinging the same in opposite directions about said common axis thereby to transfer to the vehicle a portion of the weight of a railway car coupled thereto and also to raise and lower the vehicle for being alternately supported by said road wheels and said rail wheels.

7. The improvement according to claim 6 further defined by, other means defining a further continuation of the first-mentioned drive train and engaged with the other rail axle for driving the rail wheels mounted thereby, said other means also including said road wheel axle.

8. In a powered vehicle of the type having a coupler head adapted for coupling and lifting engagement with a railway car coupler thereby to move one or more railway cars along a section of track, the improvement comprising, said vehicle having a set of rail wheels and a separate set of road wheels, said vehicle including powered means connected by a first drive train to the axle of at least one of the road wheels for driving the same, said rail wheels consisting of two pairs of such wheels mounted respectively on a pair of rail axles which are disposed one on each side of said road wheel axle in parallel relation therewith, first and second arm means each connected at one end thereof to respective rail axles, said arm means being pivotally connected at the other ends thereof to the vehicle for swinging movement about a common axis which is co-axial with the central axis of said road wheel axle, second and third drive trains connecting said road wheel axle with respective rail axles for driving the latter, and other powered means carried by the vehicle and engaged with said first and second arm means for swinging the same in opposite directions about said common axis thereby to transfer to the vehicle a portion of the weight of a railway car coupled thereto and also to raise and lower the vehicle for being alternately supported by said rail wheels and road wheels.

9. The improvement according to claim 8 wherein said second and third drive trains comprise, a first pair of sprocket wheels mounted on respective rail axles and a second pair of sprocket wheels mounted on said road wheel axle, a pair of chains connecting said second pair of sprocket wheels with the first pair of sprocket wheels.

10. The improvement according to claim 12 wherein said other powered means comprise, a generally right-angle arm mounted on the vehicle intermediate the ends of the former for pivoting movement about an axis in parallel spaced relation with said common axis, said first arm means having a rigid extension extending at a generally right-angle thereto in the plane of movement of the first arm means and adjacent said other end thereof, a first link pivotally connected at respective opposite ends thereof to said extension and to said right-angle arm adjacent one end of the latter, a second link pivotally connected at respective opposite ends thereof to the other end of said right-angle arm and to said second arm means intermediate the ends of the latter, elongated power-operated reciprocating means pivotally connected at respective opposite ends thereof to said vehicle and to said right-angle arm means adjacent either end thereof for imparting swinging movement in unison to said first and second arm means.

11. The improvement according to claim 10 wherein said reciprocating means comprises a fluid-operated piston and cylinder assembly.

12. In a powered vehicle of the type having a coupler head adapted for coupling and lifting engagement with a railway car coupler thereby to move one or more railway cars along a section of track, the improvement comprising, means on said vehicle engaged with said coupler head thereby supporting the latter for bodily movement in a horizontal arcuate path symmetrical with respect to the longitudinal centerline of the vehicle, said means serving, during the course of said bodily movement, to rock said coupler head in a horizontal plane such that the longitudinal centerline of the latter is shifted for substantial coaxial alignment with the longitudinal centerline of the coupler of a railway car positioned on a curved section of track in coupled engagement with said vehicle, said vehicle including a set of road wheels adapting the former for off-track movement and a set of rail wheels adapting the vehicle for on-track movement, the rail wheels being mounted on two rail axles, support means mounting said rail axles for vertical swinging movement relative to the vehicle about a common axis intermediate the rail axles and parallel therewith, powered means on the vehicle and engaged with said support means for moving said rail wheels vertically in opposite direction thereby to transfer to the vehicle a portion of the weight of a railway car coupled thereto and also to raise and lower the vehicle for being alternately supported by said road wheels and rail wheels, said powered means serving as the sole means for raising and lowering said vehicle and said coupler head, other powered means for driving at least one of the rail wheels and at least one of the road wheels.

13. In a powered vehicle of the type having a coupler head adapted for coupling and lifting engagement with a railway car coupler for moving one or more railway cars along a section of track, the improvement comprising, said vehicle including a set of road wheels adapting the vehicle for off-track movement, a pair of rail axles each mounting a pair of rail wheels, support means mounting said rail axles for vertical swinging movement relative to the vehicle about a common axis intermediate the rail axles and parallel therewith, powered means on the vehicle and engaged with said support means for swinging said rail wheels up and down thereby to raise and lower the vehicle for being alternately supported by the rail wheels and the road wheels and also to transfer to the vehicle a portion of the weight of a railway car coupled thereto, other powered means for driving said rail axles.

14. The improvement according to claim 13 wherein said other drive means includes a shaft coaxial with said common axis.

15. The improvement according to claim 14 wherein said shaft is constituted by an axle mounting at least one of said road wheels.

References Cited

UNITED STATES PATENTS

| 387,725 | 8/1888 | Massey | 213—2 |
| 1,170,982 | 2/1916 | Martin | 213—2 |
| 1,937,532 | 12/1933 | Ronk | 105—215 |
| 2,130,747 | 9/1938 | Soulis | 105—215 |
| 2,722,897 | 11/1955 | Morey | 105—73 |

DRAYTON E. HOFFMAN, *Primary Examiner.*

U.S. Cl. X.R.

213—2, 12, 75; 105—215, 26

UNITED STATES PATENT OFFICE
CERTIFICATE OF CORRECTION

Patent No. 3,420,191 January 7, 1969

Eugene B. White, Jr.

It is certified that error appears in the above identified patent and that said Letters Patent are hereby corrected as shown below:

Column 9, line 3, "76" should read -- 76′ --. Column 11, line 43, the claim reference numeral "12" should read -- 8 --.

Signed and sealed this 7th day of April 1970.

(SEAL)
Attest:

Edward M. Fletcher, Jr.　　　　　　　　　　　　WILLIAM E. SCHUYLER, JR.
Attesting Officer　　　　　　　　　　　　　　　　　Commissioner of Patents